United States Patent [19]

Robertson et al.

[11] 4,107,681
[45] Aug. 15, 1978

[54] METHOD AND APPARATUS FOR AUTOMATICALLY ADJUSTING THE RESOLUTION OF A RADIO ALTIMETER OVER ITS OPERATING ALTITUDE RANGE

[75] Inventors: Roy E. Robertson; Robert J. Weber, both of Marion, Iowa

[73] Assignee: Rockwell International Corporation, El Segundo, Calif.

[21] Appl. No.: 800,685

[22] Filed: May 26, 1977

[51] Int. Cl.² ............................................. G01S 9/28
[52] U.S. Cl. .................................. 343/12 A; 343/14; 343/5 DP; 343/17.7
[58] Field of Search .................... 343/12 A, 14, 5 DP, 343/17.7

[56] References Cited

FOREIGN PATENT DOCUMENTS 1,207,565 10/1970 United Kingdom .................. 343/12 A Primary Examiner—Richard A. Farley
Assistant Examiner—Lawrence Goodwin
Attorney, Agent, or Firm—Richard A. Bachand; H. F. Hamann

[57] ABSTRACT

Method and apparatus for automatically adjusting the resolution of a CWFM radio altimeter includes a counter for counting a signal produced by the altimeter having a period relatable to the altitude desired to be measured. Another counter counts the number of pulses of a time reference signal occurring over a predetermined number of periods of the altitude related signal. The number of periods of the altitude related signal over which the time-reference-signal pulses are counted is automatically determined by a circuit responsive to the fullness of the time-reference-signal pulse counter to produce a signal after the counter has reached a predetermined count. The next occurring multiple of the altitude related signal is then determined, and the number of time-reference-signal pulses then counted is divided by the number of the multiple found.

In a particular embodiment, the counters are binary counters, and the multiples determined are powers of 2, whereby the division is achieved by shifting the data in shift registers a number of places corresponding to the number of multiples of $2^N$ found.

9 Claims, 6 Drawing Figures

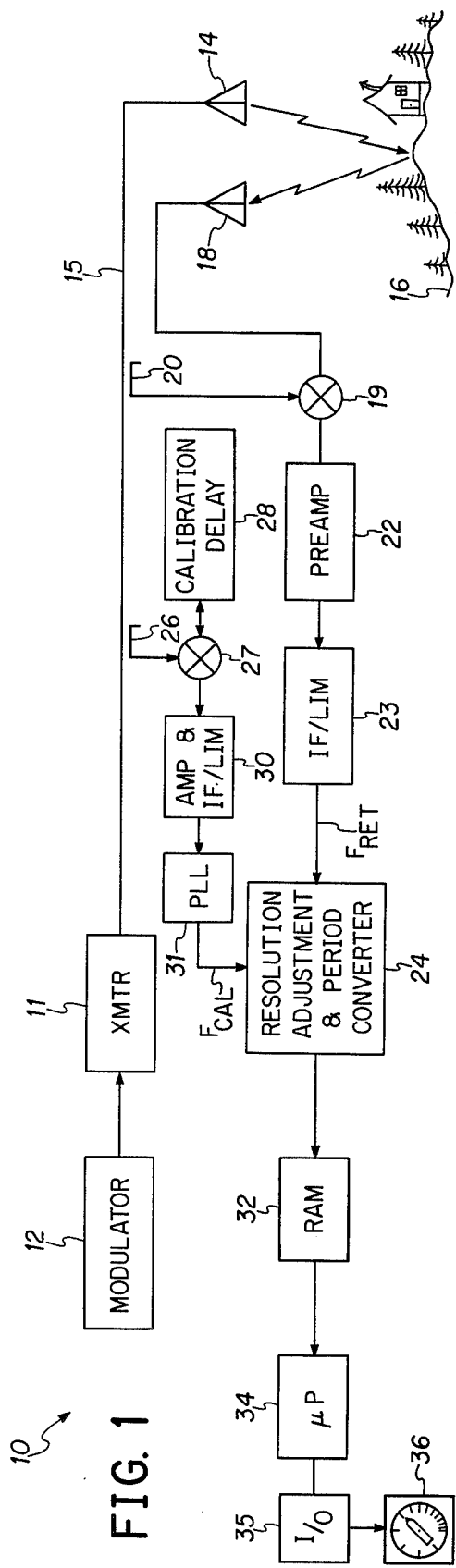
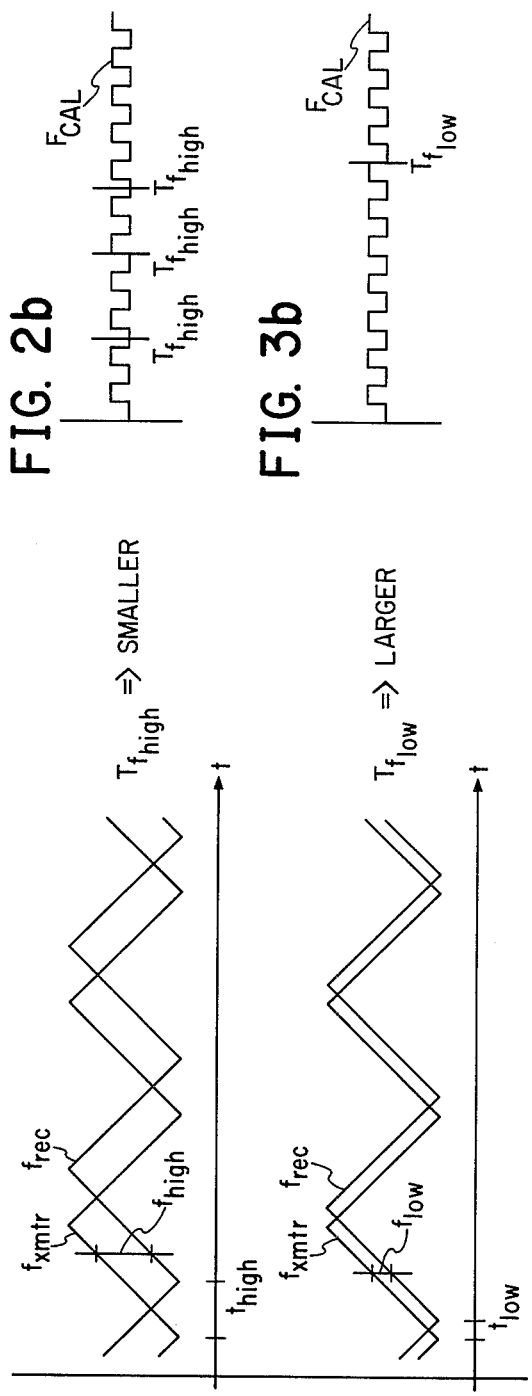

METHOD AND APPARATUS FOR AUTOMATICALLY ADJUSTING THE RESOLUTION OF A RADIO ALTIMETER OVER ITS OPERATING ALTITUDE RANGE

BACKGROUND OF THE INVENTION

1. Field of the Invention

This invention relates to improvements in radio altimeters, and, more particularly, to a method and apparatus for automatically adjusting the resolution of a digital radio altimeter over its range of altitudes of operation.

2. Description of the Prior Art

Radio altimeters of the CWFM type have been known for a number of years. Until recently, the data processing techniques which have been employed in conjunction with such altimeters have been for the most part analog. Recently, a digital CWFM radio altimeter processor was proposed in U.S. patent application Ser. No. 800,684, contemporaneously filed herewith, entitled "Radio Altimeter and Method for Operating Same" and assigned to the assignee hereof.

Briefly, such digital CWFM radio altimeters transmit a signal frequency modulated with a shaped waveform and detect the reflections from the underlying terrain. The reflections, delayed by a time proportional to the two-way travel time of the signal, are detected, then mixed with the currently transmitted signal to produce a signal of frequency equal to the difference between the detected reflections and the transmitted signal. The mixed signal is then digitized, and its period determined. The period of the mixed signal is then utilized to directly determine the altitude of the aircraft with which the system is used.

In determining the period of the mixed return signal, it is compared with a calibration frequency derived, for example, from an oscillator operating at a known frequency. Thus, the number of oscillator periods occurring within a period of the mixed return signal is determined for indicating the height of the aircraft. At lower altitudes, the period of the mixed return signal is large, thereby encompassing a large number of clock periods, enabling accurate low altitude measurements to be made. At higher altitudes, on the other hand, the period of the mixed return signal is relatively small, encompassing few, if any, of the clock periods. Consequently, in order to accurately resolve higher altitudes, it would be necessary to use a comparison clock frequency which is relatively high. High frequency clocks, however, are incompatible with presently available MOS devices, and must be implemented with high speed TTL devices for an economic realization of the system. That is, to effect reasonable resolution at altitudes over which radio altimeters are ordinarily used, for example, to 2500 feet, clock frequencies on the order of 25 MHz are necessary. Such frequencies are beyond the range of MOS device technology, without undue expense.

SUMMARY OF THE INVENTION

In light of the above, it is therefore an object of the invention to provide an improved CWFM radio altimeter.

It is another object of the invention to provide a method and apparatus for automatically adjusting the resolution of a CWFM radio altimeter of the type which uses digital data processing techniques to enable the use of lower clock frequencies for period determination in altitude measurement.

It is another object of the invention to provide a method and apparatus for automatically adjusting the resolution of a CWFM radio altimeter over the altitude range of operation which enables the use of MOS devices in the realization of the data processing circuitry.

These and other objects, features, and advantages will become apparent to those skilled in the art from the following detailed description when read in conjunction with the accompanying drawing and appended claims.

In its broad aspect, the invention provides a radio altimeter which includes means for generating a first pulse signal of period relatable to an altitude desired to be measured. A source of clock pulses provides timing pulses to means for counting the number thereof occurring within a selected multiple of periods of the first pulse signal. Automatic multiple selection means responsive to the count of the clock pulse counter selects the next multiple of the first pulse signal which occurs, and clock pulse dividing means divides the number of clock pulses counted by the automatically selected multiple.

BRIEF DESCRIPTION OF THE DRAWING

The invention is illustrated in the accompanying drawing wherein:

FIG. 1 is a box diagram of a CWFM radio altimeter utilizing the resolution adjustment in accordance with the principles of the invention.

FIG. 2a is a graph of frequency versus time, showing the transmitted and reflected signal waveforms produced by the CWFM radio altimeter of FIG. 1 at a relatively high altitude.

FIG. 2b is a graph of amplitude versus time of a constant frequency clock, showing the comparison thereof to the period of the high frequency (high altitude) mixed return frequency.

FIG. 3a is a graph of frequency versus time showing the transmitted and reflected signal waveforms produced by the CWFM radio altimeter of FIG. 1 at a relatively low altitude.

FIG. 3b is a graph of amplitude versus time of the clock frequency of FIG. 2b, showing the comparison thereof to the period of the low frequency (low altitude) mixed return frequency.

DETAILED DESCRIPTION OF THE PREFERRED EMBODIMENTS

Figure 4:
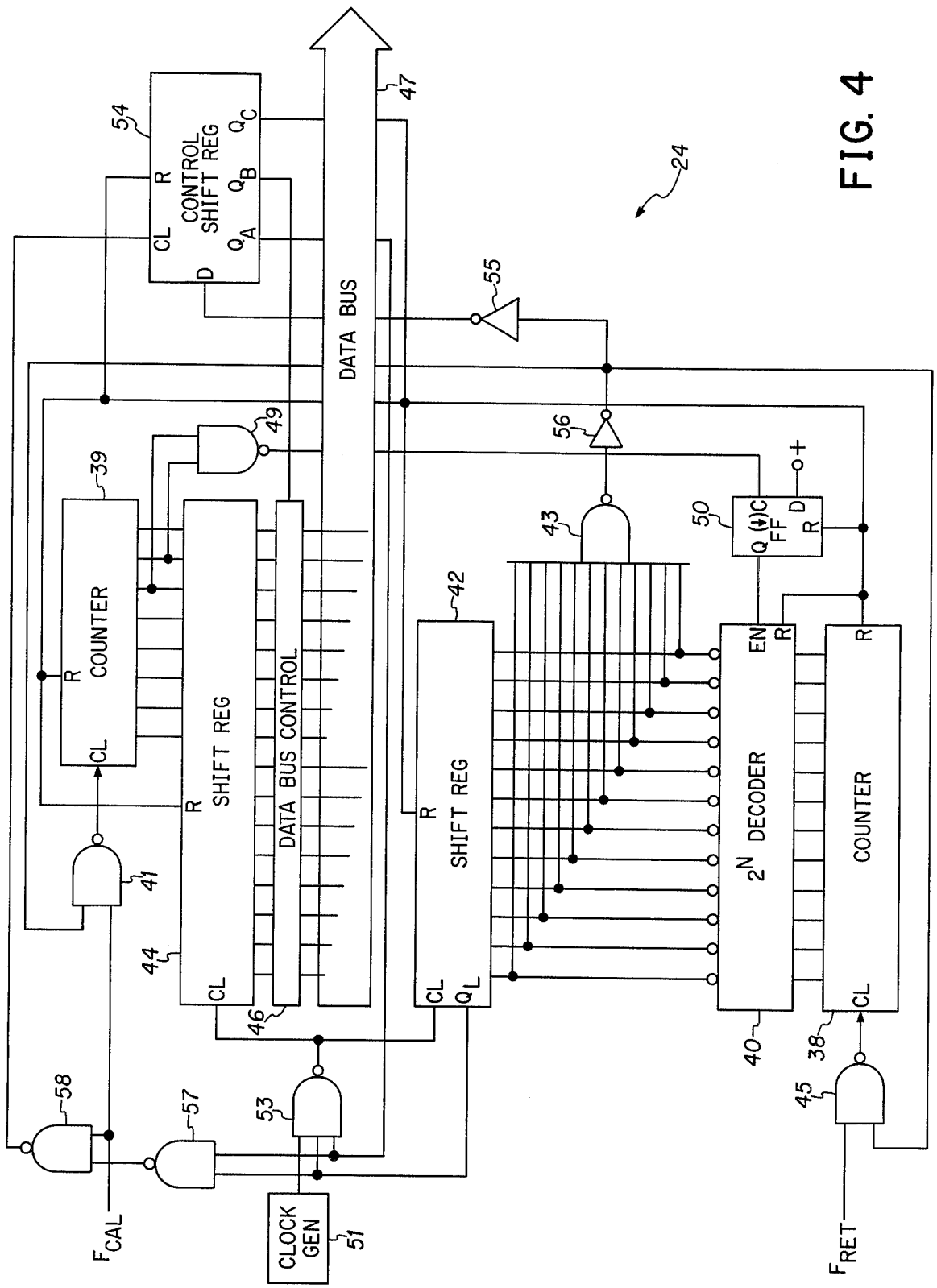
FIG. 4 is a schematic diagram of the resolution adjustment and period converter circuit, in accordance with the invention, as used in the CWFM radio altimeter of FIG. 1.

The CWFM radio altimeter 10 in accordance with the invention, shown in FIG. 1, includes a transmitter 11 modulated by a modulator 12 to deliver a signal to antenna 14 via transmission line 15. The transmitted signal is frequency modulated by the modulator 12 to vary in accordance with a predetermined function. A typical functional variation is a sawtooth waveform of frequency of about 100 Hz, sweeping a transmitter operating at approximately 4300 MHz over an excursion of about 100 MHz. As is apparent to those skilled in the art, the particular frequencies employed can be varied in accordance with the particular use intended.

The signal transmitted from the antenna 14 is reflected from the underlying terrain 16 to be detected by a receiving antenna 18. The detected signal is conducted to a mixer 19 together with a signal developed by a coupler 20 adjacent a transmitter signal carrying element, such as the transmission line 15. The transmitted and received signals are then mixed within the mixer 19 to produce a frequency at the output thereof equal to the difference of the reflected and transmitted signals, which is then amplified in a preamplifier stage 22.

The output of the preamplifier stage 22 is applied to an IF/limiter stage 23 to produce at its output a clipped square wave signal for use in making the altitude determination, as below described. This square wave signal is herein referred to as the mixed return signal, or $F_{ret}$, for convenience.

The mixed return signal is applied to a resolution adjustment and period converter 24 to produce an output directly convertable to an altitude indication.

The mixed return signal is compared within the resolution adjustment and period converter circuit 24 to a clock signal of known frequency. In the embodiment illustrated, the clock frequency is derived from the transmitted signal as follows. The transmitted signal at an output element, such as the transmission line 15, is coupled by a coupler 26 and delivered to a mixer 27. The coupled signal is applied to a calibration delay line 28, which delays the signal by a known predetermined amount, such as 300 feet. The delayed signal is then redelivered to the mixer 27 for comparison to the instantaneous or currently transmitted signal to produce at the output of the mixer 27 a signal of frequency equal to the difference of the transmitted frequency and the frequency produced by the delayed signal from the delay line 28. This signal is amplified and limited in an amplifier and IF/limiter stage 30, then multiplied in a phase-locked loop 31. The phase-locked loop 31 can produce an output pulse stream, for example, of 16 times the frequency of the output from the amplifier and IF/limiter stage 30. The phase-locked loop output signal serves as the clock signal against which the mixed return signal is compared, and is referred to herein as the calibration signal or $F_{CAL}$. Such $F_{CAL}$ derivation is described in co-pending patent application Ser. No. 800,684, filed contemporaneously herewith, entitled "Method and Apparatus for Automatically Calibrating a Radio Altimeter", and assigned to the assignee hereof.

After the period of the mixed return signal is determined by the resolution adjustment and period converter, it can be directly displayed or, if desired, can be accumulated and further processed, as illustrated. Thus, in the embodiment shown, the output of the resolution adjustment and period converter stage 24 is applied to a random access memory (RAM) 32. After a number of measurements have been taken and accumulated in the RAM 32, they may be further processed, for example, by a microprocessor 34 to produce an output to an input-output (I/O) stage 35 for delivery to an indicator device 36. The particular processing techniques can be, for instance, in accordance with those described in the patent application, Ser. No. 800,683, contemporaneously filed herewith, entitled "Radio Altimeter and Method for Operating Same".

As mentioned, and as presently explained with reference to FIGS. 2a, 2b, 3a, 3b, the signal transmitted from the antenna 14 is of a triangular waveform frequency sweep, denoted by the waveform $f_{xmtr}$, shown in FIGS. 2a and 3a. The signal received by the antenna 18 denoted by the waveform $f_{rec}$, is delayed from the transmitted signal a time depending upon the two-way travel time, or twice the altitude, of the aircraft with which the altimeter is used. Depending upon whether the aircraft is at a high altitude or low altitude, the difference between the transmitted and received signals will be large or small, as shown respectively in FIGS. 2a and 3a.

The period of the frequency difference is shown in FIGS. 2b and 3b, in comparison to the waveform of the calibration signal $F_{CAL}$. It can be seen that at the lower altitude the frequency is smaller than at higher altitudes, as can be seen in the comparison of FIGS. 2a and 3a, and the period therefore is larger as shown in FIGS. 3b and 2b. It can therefore be seen that at a higher altitude, a fewer number of calibration pulses are encompassed within a single period of the mixed return signal than at the lower altitudes. Consequently, the resolution at the higher altitudes is lower than at the lower altitudes, absent an increase in frequency of the calibration signal.

To overcome the foregoing, applicant has provided an automatic resolution adjusting circuit which counts the number of calibration pulses occurring over a variable number of periods of the mixed return signal, then divides by the number of periods of the mixed return signal to produce an accurate altitude indication, regardless of the particular altitude at which it is operated. This is achieved by the circuit shown in FIG. 4.

As shown, the mixed return signal and calibration signal are applied (via NAND gates below described) to respective clock inputs of counters 38 and 39. The parallel output of the counter 38 is applied to the inputs of a $2^N$ decoder 40, and, in turn, the inverted outputs of the $2^N$ decoder are applied to a shift register 42, as well as to the inputs of a multiple input NAND gate 43.

In a similar fashion, the outputs from the counter 39 are applied to the most significant bit inputs of a shift register 44. The shift register 44 has, for example, twice the number of data positions as the counter 39 to enable the data produced to be readily shifted therein, as will become apparent below.

The parallel outputs of the shift register 44 are applied to a data bus control circuit 46 for delivery to an output data bus 47 (connections not shown). In addition, the next to the last two outputs of the counter 39 are connected to inputs of a NAND gate 49, the output of which is connected to set a flip-flop 50. The output Q of the flip-flop 50 is connected to an enable terminal of the $2^N$ decoder 40.

A clock generator 51 has an output connected to one terminal of a three input terminal NAND gate 53, the output of which is connected to the clock inputs of the shift registers 42 and 44. The shift register 42 additionally provides an output $Q_L$ to an input of the NAND gate 53. The output $Q_L$ corresponds to the last stage within the shift register 42 to which data may be shifted.

Finally, a control shift register 54 is provided, having its clock terminal connected to receive the calibration signal and its data input connected to receive the output from the multiple input NAND gate 43, twice inverted by inverters 55 and 56. A first output terminal of the control shift register 54, denoted $Q_A$, is connected to an input of the three input NAND gate 53. A second output, denoted $Q_B$, is connected to the data bus control 46, and, finally, the third output denoted $Q_C$, is connected to reset the counters 38 and 39, the $2^N$ decoder 40, the shift registers 42 and 44, and the shift register 54, itself.

In the operation of the resolution adjustment in the period converter 24, the mixed return signal, $F_{RET}$, is applied to and counted by the counter 38. Concurrently, the calibration signal $F_{CAL}$, is applied to and counted by the counter 39. It should be appreciated that ordinarily the mixed return signal, $F_{RET}$, is at a lower frequency than the calibration signal; consequently, the counter 39 tends to fill up faster than the counter 38. When state changes are observed on the next to the last two lines of the counter 39, indicating that the counter 39 is approximately half full, the flip-flop 50 is set to enable the $2^N$ decoder to produce an output when the counter 38 next reaches an output corresponding to a power of 2. At that time, one of the output lines of the $2^N$ decoder 40 will change states from normally high to low (the outputs on the decoder being of an inverted state, as shown). The state change will be detected by the NAND gate 43, twice inverted by the inverters 55 and 56, and applied to the data terminal of the shift register 54. Additionally, the signals appearing at the output lines from the $2^N$ decoder 40 are applied to the inputs of the shift register 42. Concurrently, the outputs from the counter 39 are applied to the most significant bit positions of the shift register 44.

When a state change is detected upon one of the output lines from the $2^N$ decoder 40, as mentioned, and the counter 39 is more than half full, indicated by the state change of flip-flop 50, the output of the multiple input NAND gate 43 changes state from low to high. The high state is inverted by the inverter 56, to provide a low state to the inputs of NAND gates 41 and 45, thereby blocking further passage of the signals $F_{RET}$ and $F_{CAL}$ to their respective counters 38 and 39.

The output of the NAND gate 43 is then re-inverted by the inverter 55, to thereby apply a high state to the D input of the shift register 54. Upon the occurrence of the next clock pulse, $F_{CAL}$, the $Q_A$ output terminal will change states, thereby removing the low state previously presented thereat to the NAND gate 53. In addition, the last stage output $Q_L$ of the shift register 42 will be in a high state (unless the first $2^N$ output is activated indicating that no data shift is necessary, as will become apparent). Thus, the output from the clock 51 is enabled to pass the NAND gate 53 to the clock terminals of the shift registers 42 and 44.

The shift registers 42 and 44 are connected to shift the data therein to the left in synchronism with each clock pulse supplied by the clock generator 51. The shift continues until the low state produced by the $2^N$ decoder appears at the last output terminal $Q_L$ of the shift register 42, thereby disabling further passage of the pulse from the clock generator 51 through the NAND gate 53. Thus, the data applied by the counter 39 to the most significant bits of the shift register 44 has been shifted to the left in the shift register 44 a number of places corresponding to the power of 2 reached by the number of mixed return signal periods counted by the counter 38.

In addition to enabling the passage of the clock pulses from the generator 51, the $Q_A$ output disables the control shift register 54 from shifting the control pulse therein while the data is being shifted in registers 42 and 44. This is achieved by NAND gates 57 and 58. NAND gate 58 is connected in series with the $F_{CAL}$ supply line, and is controlled by the output of the NAND gate 57. The NAND gate 57 has its inputs connected respectively to the $Q_A$ terminal of the control shift register 54 and to the $Q_L$ terminal of the shift register 42. When $Q_A$ changes states from normally low to high, since the $Q_L$ terminal is normally high, the output of the NAND gate 57 changes from high to low, thereby disabling further passage of $F_{CAL}$ pulses through the NAND gate 58. Then, after the data has been shifted in shift registers 42 and 44, and the $Q_L$ terminal changes from high to low, the output of the NAND gate 57 resumes its previous high state, allowing $F_{CAL}$ pulses to again pass.

Thus, upon the occurrence of the next calibration signal pulse, the output terminal $Q_B$ of the shift register 54 will be activated, to activate the data bus control 46, thereby allowing the shifted data within the shift register 44 to be connected onto the data bus 47. Although not shown, the data bus control 46 can include a number of MOS transistors through the sources and drains of which the output states of the shift register 44 are applied directly to the data bus, with the state upon the output terminal $Q_B$ of the shift register 54 controlling the gate terminal. The data, therefore, within the shift register 44 is presented upon the output data bus 47 for direct utilization, or for storage in a memory, such as the memory RAM 32 of FIG. 1.

When the next calibration signal pulse $F_{CAL}$ appears, the output terminal $Q_C$ of the shift register 54 changes state, thereby resetting the counters 38 and 39, the $2^N$ decoder 40, the shift registers 42 and 44, the flip-flop 50, and itself. The circuit is then ready to begin counting the next sequence, in a fashion similar to that immediately above described.

It can be seen that in the operation of the resolution adjustment period converter circuit 24, the amount by which the data determined by the counter 39 is shifted within the register 44 is dependent entirely upon the number of cycles of the mixed return signal counted by the counter 38. Thus, at higher altitudes, the mixed return signal period is relatively short (see FIG. 2b), and more cycles will be counted by the counter 38 than at the lower altitudes having longer periods (see FIG. 3b). The data within the shift register 44 is therefore shifted more to the left at higher altitudes. The net effect of the shift to the left is a division by the number of mixed return signal cycles counted in $2^N$ multiples. Or, stated differently, the shift within the shift register 44 a number of places determined by the number of $2^N$ multiples of the mixed return frequency cycles counted, effects an immediate average of the data at the higher altitudes by virtue of the counting of the calibration signal pulses over a number of mixed return signal cycles, then dividing by the mixed return signal cycle multiple by virtue of the shift within the register 44. Thus, the resolution of the circuit is greatly enhanced with respect to the higher frequency produced smaller period mixed signals.

Further, it should be emphasized that the adjustment of the resolution is automatic. The adjustment is made by virtue of the actual number of mixed return signal cycles counted. The shift or division, since it is by $2^N$ multiples, is, in essence, comparable to shifting a decimal point in conventional (base 10) mathematics, but, since the computations are in binary (base 2), $2^N$ shifts are used.

Although the invention has been described and illustrated with a certain degree of particularity, it is understood that the present disclosure has been made only by way of example and that numerous changes in the details of construction and combination and arrangement of parts may be resorted to by those skilled in the art without departing from the spirit and scope of the invention as hereinafter claimed.

We claim:

1. A CWFM radio altimeter, comprising:
   means for generating a first pulse signal of period relatable to an altitude desired to be measured, a source of time reference pulses, a first binary counter for counting said time reference pulses, a first shift register to which an output of said first binary counter is applied, a second binary counter for counting said first pulse signal, a decoder to which an output of said second binary counter is applied, a second shift register to which an output of said decoder is applied, means responsive to an occurrence of a condition of said first binary counter to enable said decoder to produce an output when, after said condition occurs, a next occurring power of two is counted by said second binary counter, means for shifting the data within said first and second shift registers a number of times corresponding to the position of the output of said decoder, and means for outputting the shifted data of said first binary counter.

2. The CWFM radio altimeter of claim 1 wherein said means for shifting comprises means for detecting the presence of said $2^N$ output at an end of said second shift register operative to discontinue said shifting.

3. A method for automatically adjusting the resolution of a CWFM radio altimeter over a range of altitudes comprising:

producing pulses having a period relatable to the altitude to be measured, counting said altitude related pulses, generating time referenced pulses, counting said time reference pulses in a counter, producing a signal when at least a predetermined minimum number of time reference pulses are counted, continuing to count said reference pulses until the count of said related pulses reaches a power of the number base of said second counter, determining a next occurring power of the number base of said counter of said altitude related pulses after said signal is produced, and dividing by the base raised to said power the count of said time reference pulses existing in said counter when said power is reached.

4. A radio altimeter comprising:

means for generating a signal of pulses having a period relatable to an altitude desired to be measured, first means for counting the pulses of said pulse signal, a source of clock pulses, second means for counting said clock pulses, means for indicating when said second counting means has reached a predetermined minimum count, means responsive to said indicating means for determining when said pulse signal count reaches a count which is divisible by a power of the base of the second counter after said second counter has reached said predetermined minimum count and for providing a signal to indicate the exponent of the power determined, means for stopping the counts of said clock pulse and pulse signal counters when said determining means determines that the pulse signal is divisible by a power of the base of the second counter, and means for shifting said count of said clock pulse counting means a number of positions corresponding to the exponent indicated by said signal to indicate the exponent.

5. The radio altimeter of claim 4 wherein said source of clock pulses comprises:

means for generating a signal of pulses having a period relatable to a fixed reference altitude.

6. The radio altimeter of claim 4 wherein said second counter is a binary counter.

7. The radio altimeter of claim 6 wherein said means for determining when said second counting means has reached a predetermined minimum count comprises:

gate means connected to said second counter to produce a state change at an output thereof when said second counter reaches a count corresponding to approximately half of the capacity of said second counter.

8. The radio altimeter of claim 7 wherein said means for determining when the count of said second counter is divisible by a power of the second counter comprises:

a decoder having a plurality of inputs connected to receive outputs of said first counter and having a plurality of outputs each corresponding to a power of 2.

9. The radio altimeter of claim 8 wherein said means for shifting said count of said clock pulse counting means comprises:

first and second shift registers, said first shift register being connected to receive the count of said second counting means, said second shift register being connected to receive said second shift register being connected to receive said outputs of said decoder, a source of second clock pulses, gate means connected to apply the second clock pulses to said first and second shift registers, said gate means having an input connected to receive an output of said second shift register whereby said second clock pulses are passed to said first and second shift registers until a said signal indicating the exponent of the power determined is shifted to the output of said second shift register.

* * * * *